(12) United States Patent
Veerasamy

(10) Patent No.: US 6,592,992 B2
(45) Date of Patent: *Jul. 15, 2003

(54) HYDROPHILIC COATING INCLUDING DLC

(75) Inventor: Vijayen S. Veerasamy, Farmington Hills, MI (US)

(73) Assignee: Guardian Industries Corp., Auburn Hills, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 09/899,176

(22) Filed: Jul. 6, 2001

(65) Prior Publication Data

US 2002/0001718 A1 Jan. 3, 2002

Related U.S. Application Data

(60) Division of application No. 09/577,337, filed on May 24, 2000, now Pat. No. 6,303,225, which is a continuation-in-part of application No. 09/557,319, filed on Apr. 25, 2000, now Pat. No. 6,284,377, which is a continuation-in-part of application No. 09/442,805, filed on Nov. 18, 1999, now Pat. No. 6,338,901, and a continuation-in-part of application No. 09/303,548, filed on May 3, 1999, now Pat. No. 6,261,693.

(51) Int. Cl.$^7$ .................................................. B32B 9/10
(52) U.S. Cl. ........................ 428/408; 428/426; 428/704
(58) Field of Search .................................... 428/408, 426, 428/704

(56) References Cited

U.S. PATENT DOCUMENTS

| | | |
|---|---|---|
| 4,210,431 A | 7/1980 | Bachman et al. |
| 4,504,519 A | 3/1985 | Zelez |
| RE32,272 E | 10/1986 | Funaki et al. |
| 4,728,529 A | 3/1988 | Etzkorn et al. |
| 4,816,291 A | 3/1989 | Desphandey et al. |
| 5,026,415 A * | 6/1991 | Yamamoto et al. |
| 5,378,527 A | 1/1995 | Nakanishi et al. |
| 5,425,983 A | 6/1995 | Propst et al. |
| 5,508,368 A | 4/1996 | Knapp et al. |
| 5,637,353 A | 6/1997 | Kimock et al. |
| 5,653,812 A | 8/1997 | Petrmichl et al. |
| 5,665,424 A | 9/1997 | Sherman |
| 5,846,649 A | 12/1998 | Knapp et al. |
| 5,849,368 A | 12/1998 | Hostettler et al. |
| 5,854,708 A | 12/1998 | Komatsu et al. |
| 5,858,477 A | 1/1999 | Veerasamy et al. |

(List continued on next page.)

FOREIGN PATENT DOCUMENTS

| | | |
|---|---|---|
| EP | 0 499 287 A1 | 8/1992 |
| WO | WO 94/12680 | 6/1994 |

OTHER PUBLICATIONS

"Optical and Electronic Properties of Amorphous Diamond", Veerasamy et al., 1993, pp. 782–787.
U. S. patent application Ser. No. 09/577,337, filed May 24, 2000.

(List continued on next page.)

Primary Examiner—Archene Turner
(74) Attorney, Agent, or Firm—Nixon & Vanderhye P.C.

(57) ABSTRACT

A substrate is coated with a hydrophilic layer(s) or coating (s) that includes, for example, amorphous carbon in a form of diamond-like carbon (DLC). In certain embodiments, the DLC inclusive layer may be doped with at least one polar inducing dopant (e.g., Boron, Nitrogen, and/or any other suitable polar inducing dopant) in order to make the layer more polar and thus more hydrophilic so as to have a lower contact angle θ (e.g., no greater than about 10 degrees in certain embodiments, and more preferably no greater than about 8 degrees).

8 Claims, 4 Drawing Sheets

U.S. PATENT DOCUMENTS

| | | | |
|---|---|---|---|
| 5,900,342 | A | 5/1999 | Visser et al. |
| 6,228,471 | B1 * | 5/2001 | Neerinck et al. |
| 6,261,693 | B1 | 7/2001 | Veerasamy |
| 6,284,377 | B1 | 9/2001 | Veerasamy |
| 6,303,225 | B1 * | 10/2001 | Veerasamy |
| 6,303,226 | B2 | 10/2001 | Veerasamy |
| 6,335,086 | B1 | 1/2002 | Veerasamy |
| 6,338,901 | B1 | 1/2002 | Veerasamy |
| 6,447,891 | B1 | 9/2002 | Veerasamy et al. |
| 6,461,731 | B1 | 10/2002 | Veerasamy et al. |

OTHER PUBLICATIONS

U. S. patent application Ser. No. 09/577,319, filed Apr. 25, 2000.

U. S. patent application Ser. No. 09/442,805, filed Nov. 18, 1999.

U. S. patent application Ser. No. 09/303,548, filed May 3, 1999.

"Ventree Super Hydrophilic Material", 10 pp.

A Dissertation, "Tetrahedral Amorphous Carbon Deposition, Characterisation and Electronic Properties", Vijayen S. Veerasamy, Jul. 1994, pp. 1–295.

"Properties of Ion Beam Deposited Tetrahedral Fluorinated Amorphous Carbon Films (ta–C), Ronning et al., Mat. Res. Soc. Symp. Proc. vol. 593, pp. 335–340 (2000)."

"Fluorinated Diamond Like Carbon Films Produced by Plasma Immersion Ion Processing Technique, Hakovirta et al., Mat. Res. Soc. Symp. Proc. vol. 593, pp. 285–290 (2000)."

"Surface Hardening of Ceramic and Glass Materials", IBM Corp. 1993, vol. 36. No. 03, Mar. 1993.

* cited by examiner

HYDROPHILIC COATING INCLUDING DLC

RELATED APPLICATIONS

This application is related to each of U.S. patent application Ser. Nos. 09/557,319, filed Apr. 25, 2000, entitled "Hydrophobic Coating Including DLC on Substrate", 09/442,805, filed Nov. 18, 1999, and 09/303,548, filed May 3, 1999, the entire disclosures of which are all hereby incorporated herein by reference.

This application is a division of application Ser. No. 09/577,337 now U.S. Pat. No. 6,303,225, filed May 24, 2000, which is a CIP of Ser. No. 09/557,319 now U.S. Pat. No. 6,284,377, filed Apr. 25, 2000; which is a CIP of Ser. No. 09/442,805 now U.S. Pat No. 6,338,901, filed Nov. 18, 1999; and a CIP of Ser. No. 09/303,548 now U.S. Pat. No. 6,261,693 filed May 3, 1999, the entire content of which is hereby incorporated by reference in this application.

HYDROPHILIC COATING INCLUDING DLC

This invention relates to a hydrophilic coating including diamond-like carbon (DLC) provided on (directly or indirectly) a substrate of glass, plastic, or the like, and a method of making the same.

BACKGROUND OF THE INVENTION

It is often desirable to provide a hydrophilic coating (e.g., anti-fog coating) on a substrate such as an automotive windshield, automotive window, automotive mirror, architectural mirror, bathroom mirror, or the like. Such coatings may reduce the likelihood of water drops deposited on the substrate taking globular shape(s), thereby enabling visibility to be improved. In other words, hydrophilic coatings function to reduce bead-like condensation on substrate surfaces (e.g., on the interior surface of an automotive windshield or window). A hydrophilic coating can reduce the formation of many tiny droplets of liquid, which can scatter light, on a surface (i.e., make condensation on a surface film-wise as opposed to droplet-wise).

Unfortunately, certain hydrophilic coatings are not as durable and/or hard as would otherwise be desired and thus are not efficient from a practical point of view for applications such as automotive windshields and/or windows. Furthermore, conventional hydrophilic coatings often cannot withstand high temperatures without breaking down or being damaged. The ability to withstand high temperatures is useful in applications such as automotive windshields where it may be desirable to anneal and/or bend a coated glass article at high temperature(s) after the coating has been deposited.

In view of the above, it is apparent that there exists a need in the art for (i) a coated article (e.g. coated glass dr plastic substrate) having hydrophilic properties, and a method of making the same, (ii) a hydrophilic coating capable of withstanding high temperatures (e.g., up to 600 degrees C., and/or even up to 700 degrees C. in certain embodiments) without being substantially damaged (e.g., burned/burning) or breaking down, and/or (iii) a protective hydrophilic coating for window and/or mirror substrates that is somewhat resistant to scratching, damage, or the like.

It is a purpose of different embodiments of this invention to fulfill any or all of the above described needs in the art, and/or other needs which will become apparent to the skilled artisan once given the following disclosure.

SUMMARY OF THE INVENTION

An object of this invention is to provide a durable coated article that it is less likely to attract or be affected by bead-like liquid condensation. Exemplary applications to which such hydrophilic coating(s) may be applied include, for example without limitation, automotive windshields, automotive backlites (i.e., rear vehicle windows), automotive side windows, architectural windows, mirrors, etc.

Another object of this invention is to provide a hydrophilic coating that can withstand high temperatures (e.g., up to about 600 degrees C., and more preferably up to about 700 degrees C.) without being substantially damaged (e.g., burning).

Another object of this invention is to provide a hydrophilic coating that is chemically inert to strong acids and/or bases, and may even act as a barrier against chemical attacks on the underlying substrate in certain embodiments.

Another object of this invention is to provide a scratch resistant hydrophilic coating for use in conjunction with a coated article.

Another object of this invention is to form or provide a hydrophilic coating by doping diamond-like carbon (DLC) with at least one polar inducing dopant(s) such as, for example, boron (B) and/or nitrogen (N). In certain embodiments, the atomic percentage of the polar inducing dopant(s) (e.g., B and/or N dopants, but not including H dopants that may or may hot be added because H is not a polar inducing dopant) is no greater than about 10%, more preferably no greater than about 5%, and most preferably no greater than about 4%. A polar inducing dopant is a dopant that causes DLC to become more graphitic (e.g., cause more $sp^2$ bonds), as opposed to more tetrahedral (i.e., more $sp^3$ bonds). Polar inducing dopant(s) tend to cause the DLC inclusive layer to be more polar, which in turn increases surface energy and thus provides for a more hydrophilic coating.

Another object of this invention is to provide a coated article, wherein a layer of the coating includes both $sp^2$ and $sp^3$ carbon—carbon bonds and has a wettability W with regard to water of at least about 700 mN/m, more preferably at least about 750 mN/m, and most preferably at least about 800 mN/m. This can also be explained or measured in Joules per unit area ($mJ/m^2$).

Another object of this invention is to provide a coated article, wherein a layer of the coating includes both $sp^2$ and $sp^3$ carbon—carbon bonds and has a surface energy $Y_c$ of at least about 24 mN/m, more preferably at least about 26 mN/m, and most preferably at least about 28 mN/m.

Another object of this invention is to provide a coated article, wherein a DLC inclusive layer of the coating has an initial (i.e. prior to being exposed to environmental tests, rubbing tests, acid tests, UV tests, or the like) water contact angle θ of no greater than about 10 degrees, more preferably no greater than about 8 degrees, even more preferably no greater than about 6 degrees, and most preferably no greater than about 4 degrees. The article's initial contact angle θ may be as low as 1–3 degrees in certain embodiments. In certain embodiments the article's contact angle may increase over time upon exposure to environmental elements (as graphitic $sp^2$ C—C bonds wear off) while in other embodiments the article's contact angle may decrease over time upon such exposure.

Another object of this invention is to provide a hydrophilic DLC inclusive layer for coating a substrate. In at least one portion of the layer no more than about 70% of the bonds in that portion of the layer are of the $sp^3$ type, and more preferably no more than about 60% of the bonds are of the $sp^3$ type. A substantial portion of the remainder of the bonds may be of the graphitic or $sp^2$ type. The bonds in the layer may include, for example, carbon—carbon (C—C) bonds, carbon-nitrogen (C—N) bonds, carbon-boron (C—B) bonds, and/or carbon-hydrogen (C—H) bonds. The $sp^3$ type bonds (e.g., C—C bonds) function to increase the hardness and scratch resistance of the coating, while the graphitic $sp^2$ type bonds (e.g., C=C, C=N and/or C=B bonds) cause the coating to be more hydrophilic and have a lower contact angle.

Another object of this invention is to provide a coating which can make accumulated condensation form in a more film-wise manner; as opposed to a droplet-wise manner.

Still another object of this invention is to form amine ($NH_2$) functional groups near the surface of a hydrophobic coating or layer so as to enhance hydrophilicity.

Yet another object of this invention is to fulfill any or all of the above listed objects and/or needs.

Generally speaking, this invention fulfills any or all of the above described needs or objects by providing a method of making a coated article comprising the steps of:

providing a substrate; and depositing a hydrophilic layer including sp carbon—carbon bonds on the substrate in a manner such that the hydrophilic layer has an initial contact angle θ with a drop of water thereon of no greater than about 10 degrees.

This invention further fulfills any or all of the above described needs and/or objects by providing a coated glass article comprising:

a glass substrate;

a hydrophilic layer including diamond-like carbon (DLC) with $sp^3$ carbon—carbon bonds provided on said glass substrate; and wherein said hydrophilic layer includes at least one dopant therein so as to cause the layer to have an initial contact angle θ with a sessile drop of water thereon of no greater than about 10 degrees.

This invention further fulfills any or all of the above described needs and/or objects by providing a coated article comprising:

a substrate (e.g., glass or plastic);

a hydrophilic coating or layer including diamond-like carbon (DLC) provided on said substrate; and wherein said hydrophilic coating or layer has an average hardness of at least about 10 GPa and has an initial contact angle θ with a drop (e.g., sessile drop) of water thereon of no greater than about 10 degrees.

This invention further fulfills any or all of the above described needs and/or objects by providing a coated article comprising:

a substrate; and a layer comprising amorphous diamond-like carbon on said substrate, said layer having a surface energy $Y_c$ of at least about 26 mN/m.

This invention still further fulfills any or all of the above described needs and/or objects by providing a coated article comprising:

a substrate; and a layer comprising amorphous diamond-like carbon on said substrate, said layer having a contact angle θ with a drop of water thereon of no greater than about 10 degrees.

This invention will now be described with respect to certain embodiments thereof, along with reference to the accompanying illustrations.

IN THE DRAWINGS

DETAILED DESCRIPTION OF CERTAIN EMBODIMENTS OF THIS INVENTION

Figure 1:
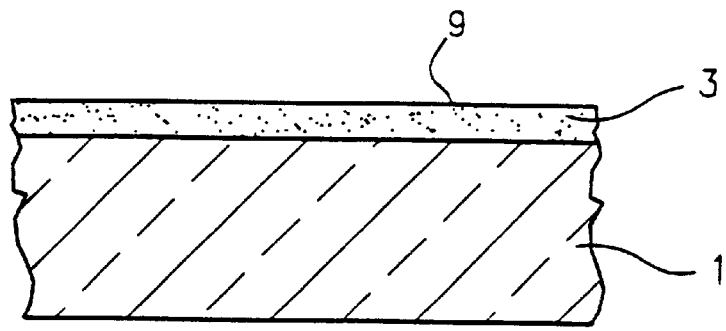
FIG. 1 is a side cross sectional view of a coated article according to an embodiment of this invention, wherein a glass or plastic substrate is provided with a hydrophilic coating thereon including a DLC inclusive layer.

Referring now more particularly to the accompanying drawings in which like reference numerals indicate like elements throughout the accompanying views.

Certain embodiments of this invention relate to improving hydrophilic qualities of a coated article (e.g., automotive windshield, automotive backlite, automotive side window, snow-mobile windshield, architectural window, mirror, etc.) by providing a diamond-like carbon (DLC) inclusive layer or coating on a substrate in a manner such that the resulting article and/or layer has hydrophilic qualities or characteristics. It has been found that by doping DLC with at least one polar inducing dopant (e.g., Nitrogen (N), Boron (B), and/or any other suitable polar inducing dopant), the DLC inclusive layer may be made more polar so as to have a higher surface energy and thus be more hydrophilic.

The provision of the at least one polar inducing dopant increases the polar component of the DLC inclusive layer's surface energy, which in turn increases the layer's total surface energy. The higher the surface energy, the more hydrophilic the layer and the lower the contact angle θ. Thus, by increasing the surface energy via the dopant(s), the hydrophilicity can be improved and thus the contact angle θ can be lowered. Combining the hydrophilicity with the use of an amorphous diamond-like carbon (DLC) layer/coating provided on the base substrate enables the resulting coated article to have a low contact angle θ as well as surface hardness and scratch resistant characteristics sufficient such that the article may be used in automotive and other high exposure environments where durability is desired.

FIG. 1 is a side cross-sectional view of a coated article according to an embodiment of this invention, wherein at least one diamond-like carbon (DLC) inclusive protective coating(s) or layer 3 is provided on substrate 1. The coated article has an exterior or outer surface 9. Substrate 1 may be of glass, plastic, ceramic, or the like. Layer or coating 3 includes at least one polar inducing dopant therein which causes bonds in the DLC inclusive layer to be more polar, which in turn causes a higher surface energy and lower contact angle θ. The dopant(s) cause more graphitic or polar $sp^2$ type bonds (e.g., C—C $sp^2$ type bonds, C—N $sp^2$ type bonds, and/or C—B $sp^2$ type bonds) to be formed in layer 3 so that the layer includes both sp type and sp type (e.g., C—C sp type) bonds. When more bonds in layer 3 become polar, this results in water being more attracted to the layer 3 since water is polar. The tetrahedral amorphous $sp^3$ type C—C bonds (ta-C) provide the layer 3 with acceptable hardness and/or scratch resistance characteristics while the $sp^2$ type C—C and C-dopant bonds improve the layer's hydrophilicity. Preferably, a substantial portion of the carbon in layer 3 is in amorphous or disordered form (as opposed to crystalline form for example).

The dots in layer/coating 3 in FIG. 1 illustrate the dopant, which is shown as being relatively evenly or uniformly distributed throughout the thickness of layer 3. As evident from the above, exemplary polar-inducing dopants include, but are not limited to, Nitrogen (N), Boron (B), Phosphorous (P), As, S, Sb, Ga, In, and the like. Dopants such as N and B may be used either alone or in combination to dope the DLC inclusive layer 3 in certain embodiments so as to improve the layer's hydrophilicity. Layer 3 functions in a hydrophilic manner (i.e. it is characterized by low contact angles θ and/or high surface energies) so as to reduce the occurrence of bead-like condensation forming on the coated article. Hydrophilic characteristics may be advantageous in environments such as bathroom mirror surfaces, interior surfaces of automotive windshields or windows, and the like.

In certain embodiments, hydrophilic layer 3 may be from about 50 to 1,000 Angstroms thick, more preferably from about 50 to 200 Angstroms thick. In one exemplary embodiment, layer 3 may be about 100 Angstroms thick. Moreover, in certain exemplary embodiments of this invention, layer 3 has an average hardness of at least about 10 GPa, more preferably of at least about 20 GPa, even more preferably of at least about 50 GPa, and most preferably from about 50–600 GPa. In certain embodiments, layer 3 may have an average hardness of about 75 GPa. Layer 3 preferably has good abrasion resistance, a coefficient of friction of from about 0.05 to 0.20 (e.g., 0.15), and an average surface roughness of no greater than about 0.3 nm. Because of the presence of both the $sp^2$ type and $sp^3$ type bonds in layer 3, the layer preferably has a density of at least about 2.4 grams/$cm^3$ (more preferably from about 2.5 to 3.0 grams/$cm^3$). Layer 3 is preferably corrosion resistant, even in the context of significant humidity and/or heat. Layer 3 may also be inert to acids, alkalis, solvents, salts, and/or water in certain embodiments of this invention. Thus, layer 3 may act as a barrier to chemical attacks on the underlying substrate 1 (e.g., a soda-lime-silica glass substrate).

Hydrophilic layer 3 has one surface exposed to the air or the atmosphere. Layer 3, because it has been doped to make it more hydrophilic, has a much lower contact angle θ with a sessile drop of water than it otherwise would without doping. In certain embodiments of this invention, layer 3 has an initial contact angle θ with a sessile drop of water of no greater than about 10 degrees, more preferably of no greater than about 8 degrees, even more preferably of no greater than about 6 degrees, and most preferably no greater than about 4 degrees. In certain embodiments, the contact angle may be as low as 1–3 degrees.

In certain embodiments, it is desirable to thermally anneal or bend a glass substrate after it has been coated (e.g., in automotive windshield applications). Because of its unique characteristics described herein, layer 3 is capable of withstanding high temperatures without burning or breaking down. For example, layer 3 in certain embodiments is capable of withstanding temperatures of 600 degrees C. (and 700 degrees C. in certain preferred embodiments) without burning. Thus, for example, a windshield including a glass substrate 1 coated with hydrophilic layer 3 is capable of being heated and bent to a desired shape after the coating process has been completed.

In certain embodiments of this invention, the amount of polar inducing dopant material (one or more dopants) in hydrophilic layer 3 is from about 1–30%, atomic percentage, more preferably from about 1–10%, even more preferably from about 1–5%, and most preferably from about 1–4%. In certain embodiments, polar inducing dopant(s) in layer 3 may represent about 3–4% (atomic) of the atoms in layer 3. The remainder may be C and/or H in certain embodiments. In certain instances, it has been found that increasing the dopant percentage by too much can decrease the diamond like properties of the layer 3, making the layer too graphitic for practical applications in certain circumstances (e.g., the more graphitic the coating the darker and less transmissive/transparent it becomes). Since the DLC inclusive layer 3 is only doped with low amounts of polar inducing dopant(s) such as B and/or N, much of the diamond-like nature of the bonding in layer 3 is preserved. Other types of dopant (e.g., H is not a polar inducing dopant) may or may not be provided in layer 3 in certain embodiments.

Thirteen exemplary make-ups of hydrophilic layer 3 are set forth below in Chart No. 1, these exemplary make-ups being applicable to any embodiment herein including any of the embodiments of FIGS. 1–3.

CHART NO. 1

| Atomic % C | Atomic % N | Atomic % B | Polar Component | Atomic % H |
|---|---|---|---|---|
| 97 | 1.5 | 1.5 | 6 | 0 |
| 97 | 2.1 | 0.9 | 10 | 0 |
| 96 | 3.0 | 1.0 | 7 | 0 |
| 87 | 2.1 | 0.9 | — | 10.0 |
| 89 | 2.0 | 1.0 | — | 8.0 |
| 96 | 4.0 | 0.0 | — | 0 |
| 97 | 0 | 3.0 | — | 0 |
| 70 | 10.0 | 0 | — | 20.0 |
| 75 | 0 | 5.0 | — | 20.0 |
| 71 | 7 | 0 | — | 22.0 |
| 69 | 6 | 0 | — | 25.0 |
| 68 | 0 | 8 | — | 24.0 |
| 67 | 9 | 0 | — | 25.0 |

Layers or films 3 doped independently with either N or B have been found to be hydrophilic. However, it has also been found that additional surprising hydrophilic properties may result when a mixture of dopants (e.g., N and B) is used to dope DLC inclusive layer 3. In certain embodiments, the ratio of N to B may be approximately 2:1 (N:B).

Optical characteristics of layer 3, such as n & k refractive indices, and Tauc optical bandgap, can be tailored/adjusted by changing the concentration or percentage of dopants (e.g., N and/or B) in the layer/film. The optical bandgap may be varied between 1.75 and 3.2 eV in certain embodiments.

The "n" refractive index at 550 nm may be varied between, for example, 1.6 and 2.3, while the "k" refractive index at 550 nm may be varied between, for example, 0.01 and 0.1 in certain embodiments (permittivity at GHz 4.7). In certain embodiments, a high bandgap (e.g., above 3 eV) and/or an absorption coefficient greater than about $10^6$ cm$^{-1}$ implies that such films/layers 3 are ultraviolet is (UV) absorbing. Strong binding energy also implies strong UV radiation resistance. In certain embodiments, UV transmission of layer 3 at 350 nm is no greater than about 40% (preferably no greater than about 35%).

In the FIG. 1 embodiment, the dopant(s) may be distributed in a fairly uniform manner throughout the thickness of layer 3, as illustrated. For example, dopant inclusive gas may be provided in an ion deposition apparatus throughout the entire course of the deposition process for layer 3.

Figure 2:
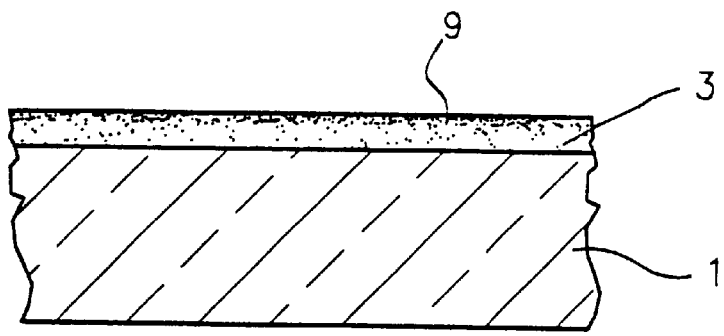
FIG. 2 is a side cross sectional view of a coated article according to another embodiment of this invention, wherein a glass or plastic substrate is provided with a hydrophilic coating thereon including a DLC inclusive layer.

In the FIG. 2 embodiment, the dopant(s) is/are not uniformly distributed throughout the entire thickness of hydrophilic layer 3. Instead, a more significant portion of dopant (s) is provided near the exterior surface of layer 3 than near the interface between layer 3 and substrate 1, as shown in FIG. 2. The presence of the dopant(s) at or near the exterior surface of layer 3 enables the bonds near the layer's surface to be more graphitic. Thus, layer 3 still has the hydrophilic properties described herein (e.g., low contact angle(s). For example, in certain embodiments the outermost 10 angstrom (A) thick portion (or 10 nm thick portion in other embodiments) of layer 3 may include at least about 3% dopant atoms (e.g., N, B, P, As, Sb, Ga, and/or In), more preferably at least about 5%, and most preferably at least about 7%. The provision of these polar inducing dopant atoms near the coating's surface results in a more polar coating surface. The rest of layer 3 (i.e., the middle of layer 3 and/or the portion of layer 3 adjacent the substrate or some intermediate layer) may be of or include undoped DLC in certain embodiments, or alternatively may be of or include DLC doped with Si, O, or H. This enables many of the graphitic sp$^2$ type bonds to be located at or near the exterior surface of layer 3. Too many sp$^2$ type bonds in layer 3 can undesirably reduce its transparency or transmission characteristics, so in some embodiments it may be desirable to minimize the presence of sp$^2$ type bonds at locations other than at or near the exterior surface where they are needed to lower the contact angle θ of the layer 3.

In an exemplary embodiment of this invention (see the tenth listed exemplary make-up listed above in Chart No. 1), where the C is doped with N and H, it has been found that the provision of the N causes amine (NH$_2$) functional groups to be formed at or near the surface of layer 3. In such amine groups, for example, one of the N bonds is with a C (sp$^2$) while the other two N bonds are with H. These amine groups enhance the hydrophilic nature of the layer 3 and thus of the coated article. In exemplary amine inclusive embodiments, the layer may include from about 60–84% C, from about 1–12% B, and from about 4–39% H (atomic); and more preferably from about 65–75% C, from about 5–10% B, and from about 15–30% H.

Figure 3:
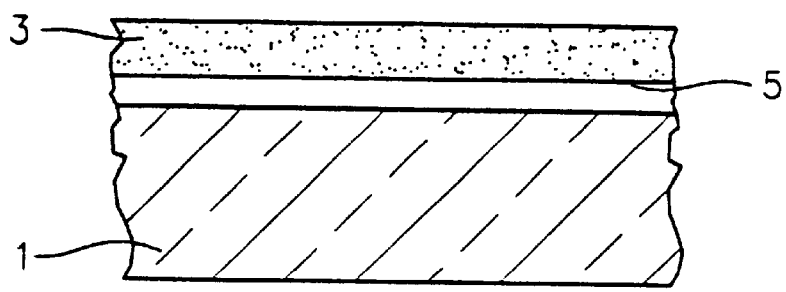
FIG. 3 is a side cross sectional view of a coated article according to another embodiment of this invention, wherein a glass or plastic substrate is provided with a hydrophilic coating thereon including a DLC inclusive layer.

FIG. 3 illustrates that in certain embodiments of this invention, at least one intermediate layer 2 may be provided between substrate 1 and the one or more hydrophilic layer(s) 3. Thus, both layer(s) 3 and layer(s) 2 are deposited on, and provided on, substrate 1 in this embodiment. Any desired layer may be utilized as an intermediate layer 2. For example, intermediate layer 2 may include a low-E layering system, another DLC inclusive layer, a silicon oxide layer, a silicon nitride layer, and/or a titanium oxide layer in certain embodiments of this invention. The term "on" (with regard to a layer being "on" a substrate or other layer) herein means supported by, regardless of whether or not other layer(s) are provided therebetween. Thus, for example, DLC inclusive layer 3 may be provided directly on substrate 1 as shown in FIGS. 1–2, or may be provided on substrate 1 with a low-E or other layer(s) therebetween as shown in FIG. 3. Exemplary layer systems (in full or any portion of these coatings) that may be used as low-E or other coating(s) 2 on substrate 1 between layer 3 and the substrate are shown and/or described in any of U.S. Pat. Nos. 5,837,108, 5,800,933, 5,770,321, 5,557,462, 5,514,476, 5,425,861, 5,344,718, 5,376,455, 5,298,048, 5,242,560, 5,229,194, 5,188,887 and 4,960,645, which are all hereby incorporated herein by reference.

In certain embodiments, in at least one portion of DLC inclusive layer 3 no more than about 70% of the bonds in the layer are of the sp$^3$ type, and more preferably no more than about 60% of the bonds in the layer are of the sp$^3$ type, so that this portion of the layer may attain hydrophilic characteristics. In certain preferred embodiments, no more than about 50% of the bonds in layer 3 are of the sp$^3$ type (e.g., sp$^3$ type C—C bonds), or in other embodiments this may be the case only near the exterior or outer surface of layer 3. A substantial portion of the remainder of the bonds are of the graphitic or sp$^2$ type. The bonds in the layer may include, for example, carbon—carbon (C—C) bonds, carbon-nitrogen (C—N) bonds, carbon-boron (C—B) bonds, and/or carbon-hydrogen (C—H) bonds. The sp$^3$ type bonds (e.g., C—C bonds) function to increase the hardness and scratch resistance of the coating, while the graphitic sp$^2$ type bonds (e.g., C—C, C—N and/or C—B bonds) cause the coating to be more hydrophilic and have a lower contact angle. It has been found that different techniques may be used to increase the number of graphitic sp$^2$ type bonds, including but not limited to a) doping as discussed herein, b) heating up the underlying substrate during the layer 3 deposition process, and/or c) utilizing a higher ion energy eV energy during the layer 3 deposition process (e.g., from about 200–600 eV, most preferably from about 375 to 425 eV). Also, the amine functional groups discussed above may also function to enhance the hydrophilic nature of the article. A higher eV energy used during the ion deposition process of layer 3 results in less sp$^3$ type bonds and more sp$^2$ type bonds. Techniques b) and/or c) may be used in combination with the doping herein to obtain hydrophilic characteristics.

In certain embodiments, DLC inclusive layer 3 and/or the coating system on substrate 1 is/are at least about 75% transparent to or transmissive of visible light rays, preferably at least about 85%, and most preferably at least about 95%.

When substrate 1 is of glass, the glass may be from about 1.5 to 5.0 mm thick, preferably from about 2.3 to 4.8 mm thick, and most preferably from about 3.7 to 4.8 mm thick. Conventional soda lime silica glass may be used as substrate 1 in certain embodiments, such glass being commercially available from Guardian Industries, Corp., Auburn Hills, Mich. In certain other embodiments of this invention, substrate 1 may be of borosilicate glass, or of substantially transparent plastic. In still further embodiments, an automotive window (e.g. windshield, backlite, or side window) including any of the above glass substrates laminated to a plastic substrate may combine to make up substrate 1, with a coating system of any of FIGS. 1–3 provided on a surface of such a substrate to form the window. In other embodiments, substrate 1 may include first and second glass sheets of any of the above mentioned glass materials laminated to one another, for use in window (e.g. automotive windshield, residential window, commercial architectural window, automotive side window, vacuum IG window, automotive backlite or back window, etc.) and/or other environments.

When substrate 1 of any of the aforesaid materials is coated with at least DLC inclusive layer 3 according to any of the FIGS. 1–3 embodiments, the resulting coated article has the following characteristics in certain embodiments: visible transmittance (Ill. A) greater than about 60% (preferably greater than about 70%, and most preferably greater than about 80%), UV (ultraviolet) transmittance less than about 38%, total solar transmittance less than about 45%, and IR (infrared) transmittance less than about 35% (preferably less than about 25%, and most preferably less than about 21%). Visible, "total solar", V, and IR transmittance measuring techniques are set forth in U.S. Pat. No. 5,800,933.

Figure 4:
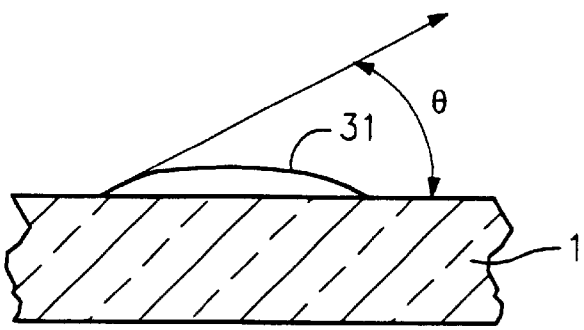
FIG. 4 is a side cross sectional partially schematic view illustrating a contact angle θ of a drop (e.g., sessile drop of water) on an uncoated glass substrate.
Figure 5:
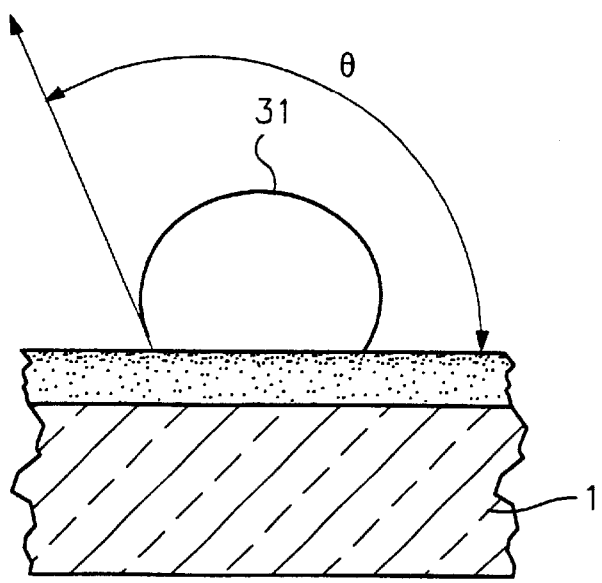
FIG. 5 is a side cross sectional partially schematic view illustrating a high contact angle θ of a drop on a coated article including a hydrophobic coating of, for example, an article disclosed in related application 09/442,805.
Figure 6:
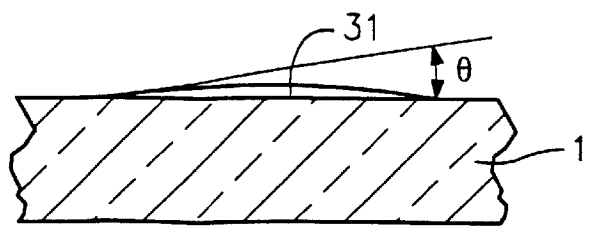
FIG. 6 is a side cross sectional partially schematic view illustrating a low contact angle θ of a drop (e.g., sessile drop of water) on a coated article according to an embodiment of this invention.

Hydrophilic performance of coating/layer 3 in any of the above embodiments is a function of contact angle θ, surface energy Y, and/or wettability or adhesion energy W. The surface energy Y of layer 3 may be calculated by measuring its contact angle θ. Exemplary contact angles θ are illustrated in FIGS. 4–6. A hydrophilic coating or layer system 3 according to an embodiment of this invention is on the substrate of FIG. 6, while no coating of any kind is on the substrate of FIG. 4 and a hydrophobic coating is on the substrate of FIG. 5. No coatings are illustrated in FIGS. 5–6 for purposes of simplicity. To measure contact angle in one embodiment, a sessile drop 31 of a liquid such as water is placed on the substrate as shown in FIGS. 4–6. A contact angle θ between the drop 31 and underlying article appears, defining an angle θ depending upon the interface tension between the three phases at the point of contact. The contact angle is greater in FIG. 5 than in FIG. 4, because the coating layer on the substrate in FIG. 5 is hydrophobic (i.e., results in a higher contact angle). However, due to this invention, the contact angle θ in FIG. 6 is much lower than in either of FIGS. 4–5.

Generally, the surface energy $Y_c$ of a layer 3 or any other article/layer can be determined by the addition of a polar and a dispersive component, as follows: $Y_c = Y_{CP} + Y_{CD}$, where $Y_{CP}$ is the layer's/coating's polar component and $Y_{CD}$ the layer's/coating's dispersive component. The polar component of the surface energy represents the interactions of the surface mainly based on dipoles, while the dispersive component represents, for example, van der Waals forces, based upon electronic interactions. Generally speaking, the higher the surface energy $Y_c$ of layer 3, the more hydrophilic the layer (and coated article) and the lower the contact angle θ.

Adhesion energy (or wettability) W can be understood as an interaction between polar with polar, and dispersive with dispersive forces, between the exterior surface 9 of the coated article and a liquid thereon such as water. $Y^P$ is the product of the polar aspects of liquid tension and article tension; while $Y^D$ is the product of the dispersive forces of liquid tension and article tension. In other words, $Y^P = Y_{LP} * Y_{CP}$; and $Y^D = Y_{LD} * Y_{CD}$; where $Y_{LP}$ is the polar aspect of the liquid (e.g. water), $Y_{CP}$ is the polar aspect of coating/layer 3; $Y_{LD}$ is the dispersive aspect of liquid (e.g. water), and $Y_{CD}$ is the dispersive aspect of coating/layer 3. It is noted that adhesion energy (or effective interactive energy) W, using the extended Fowkes equation, may be determined by:

$$W = [Y_{LP} * Y_{CP}]^{1/2} + [Y_{LD} * Y_{CD}]^{1/2} = Y_1 (1 + \cos \theta),$$

where $Y_1$ is liquid tension and θ is the contact angle. W of two materials (e.g. layer 3 and water thereon) is a measure of wettability indicative of how hydrophilic the layer or coated article is.

When analyzing the degree of hydrophilicity of layer 3 or a coated article herein with regard to water, it is noted that for water $Y_{LP}$ is 51 mN/m and $Y_{LD}$ is 22 mN/m. In certain embodiments of this invention, the polar aspect $Y_{CP}$ of surface energy of layer 3 is at least about 5, and more preferably at least about 7, and most preferably from about 7–10 (variable or tunable between 5 and 15 in certain embodiments) and the dispersive aspect $Y_{CD}$ of the surface energy of layer 3 is from about 16–22 mN/m (more preferably from about 18–20 mN/m).

Using the above-listed numbers, according to certain embodiments of this invention, the surface energy $Y_C$ of layer 3 is at least about 24 mN/m, more preferably at least about 26 mN/m, and most preferably at least about 28 mN/m; and the adhesion energy W between water and layer 3 is at least about 600 mN/m, more preferably from about 700–1,300 mN/m, even more preferably from about 750–950 mN/m, and most preferably from about 800–950 mN/m. These high values of adhesion energy W and layer 3 surface energy $Y_C$, and the low initial contact angles θ achievable, illustrate the improved hydrophilic nature of coated articles according to different embodiments of this invention.

The initial contact angle θ of a conventional glass substrate 1 with sessile water drop 31 thereon is typically from about 22–24 degrees, as illustrated in FIG. 4 (although it may be as low as 18 degrees in certain instances). Thus, conventional glass substrates are not as hydrophilic as embodiments of this invention. Moreover, layers 3 herein provide for scratch resistance and/or high durability. A normal ta-C layer, undoped, on a glass substrate is not as hydrophilic as embodiments of this invention. Inventions herein enable the contact angle of a ta-C inclusive layer 3 to be reduced to improve the hydrophilicity of a coated article, as shown by the low contact angle θ in FIG. 6.

Another advantage associated with certain layers 3 according to certain embodiments of this invention is that the layer 3 may become electrically conductive so as to reduce the likelihood of a build-up of static electricity. This reduction in resistivity is believed to be due to the doping described herein. For example, prior to doping resistivity of a ta-C layer may be, e.g., $10^8$ ohms/cm, whereas after doping the resistivity may drop to, e.g., less than about 500 ohms/cm, more preferably less than about 100 ohms/cm, most preferably from about 0.01 to 50 ohms/cm.

Layer 3 may have a dielectric constant of from about 8 to 12 at 10 kHz, preferably about 10, and may have a dielectric constant of about 2 to 6 at 100 MHz, preferably about 4. In certain embodiments, layer 3 may have an electrical breakdown strength (V cm$^{-1}$) of about $10^6$. As for thermal properties, layer 3 may have a thermal coefficient of expansion of about $9 \times 10^{-6}$/C, and a thermal conductivity of about 0.1 Wcm K.

Figure 7:
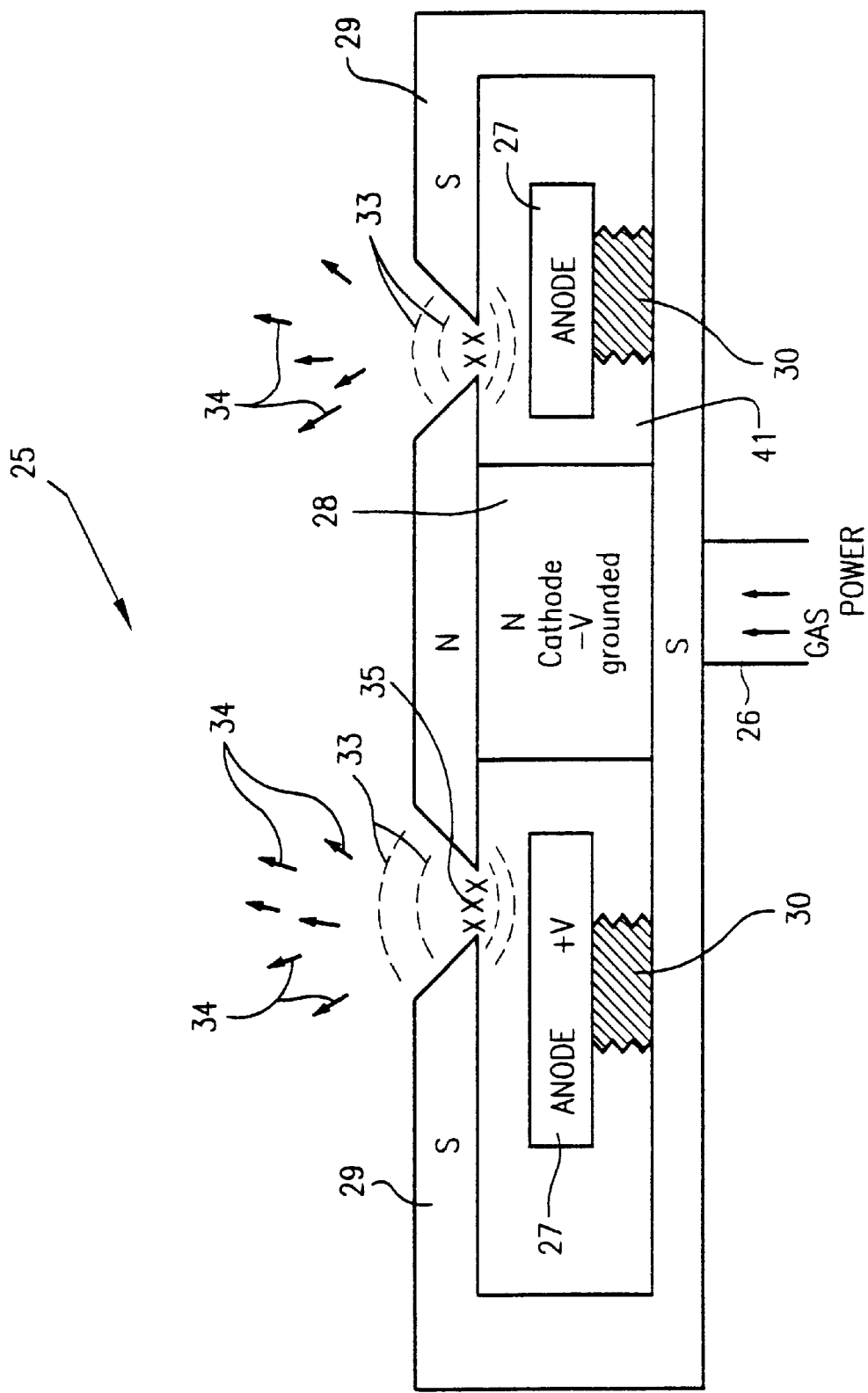
FIG. 7 is a side cross sectional view of a linear ion beam source which may be used in any embodiment of this invention for depositing a DLC inclusive hydrophilic layer (s).
Figure 8:
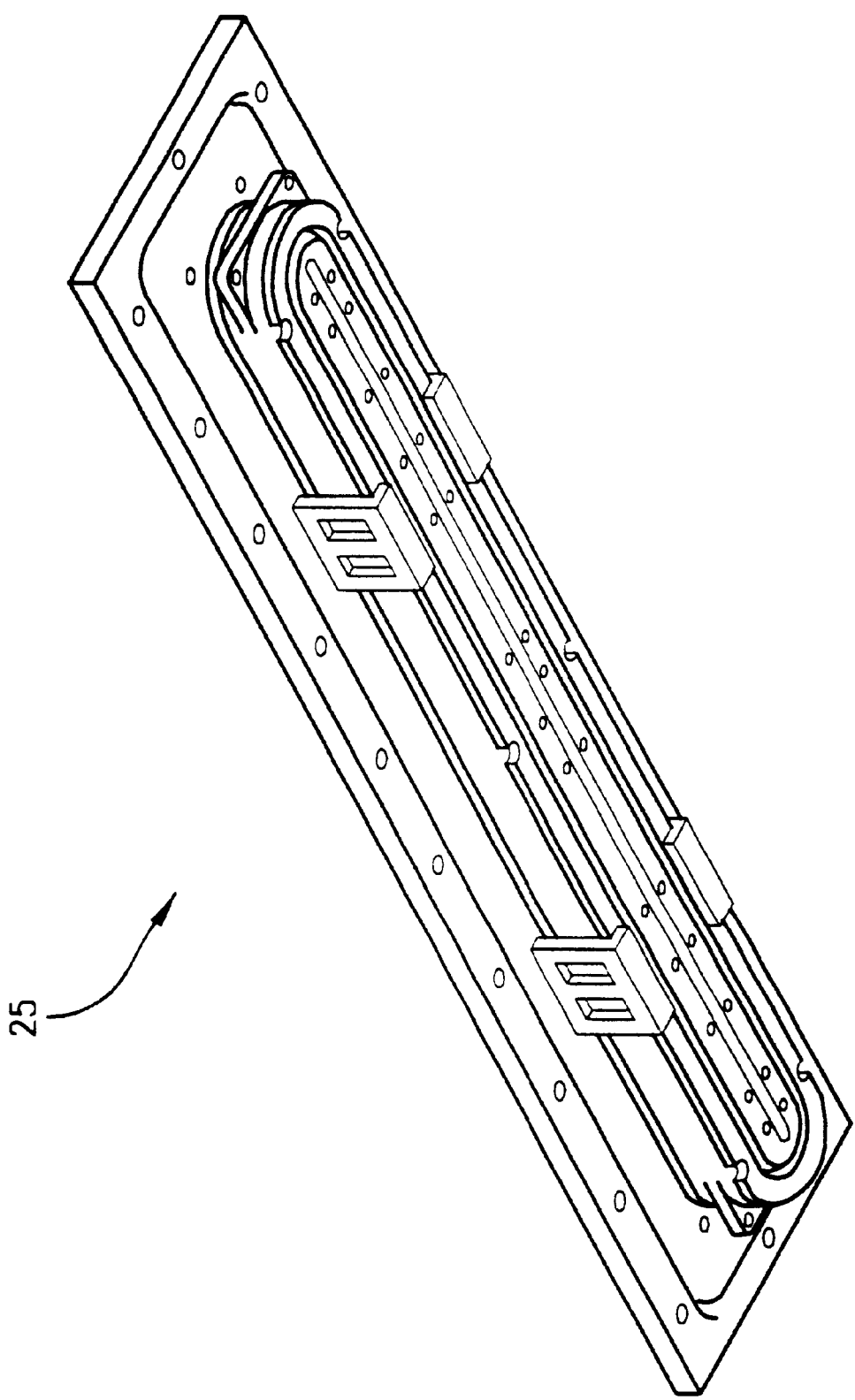
FIG. 8 is a perspective view of the linear ion beam source of FIG. 7.

FIGS. 7–8 illustrate an exemplary linear or direct ion beam source 25 which may be used to deposit layer(s) 3, clean a substrate 1, or surface plasma treat a DLC inclusive layer to add doping atoms thereto according to different embodiments of this invention. Ion beam source 25 includes gas/power inlet 26, racetrack-shaped anode 27, grounded cathode magnet portion 28, magnet poles 29, and insulators 30. A 3 kV DC power supply may be used for source 25 in some embodiments. Linear source ion deposition allows for substantially uniform deposition of DLC inclusive layer 3 as to thickness and stoichiometry.

Ion beam source 25 is based upon a known gridless ion source design. The linear source is composed of a linear shell (which is the cathode and grounded) inside of which lies a concentric anode (which is at a positive potential). This geometry of cathode-anode and magnetic field 33 gives rise to a close drift condition. The magnetic field configuration further gives rise to an anode layer that allows the linear ion beam source to work absent any electron emitter. The anode layer ion source can also work in a reactive mode (e.g., with oxygen and/or nitrogen). The source includes a metal housing with a slit in a shape of a race track as shown in FIGS. 7–8. The hollow housing is at ground potential. The anode electrode is situated within the cathode body (though electrically insulated) and is positioned just below the slit. The anode can be connected to a positive potential as high as 3,000 volts. Both electrodes may be water cooled in certain embodiments.

Feedstock gases are fed through the cavity 41 between the anode and cathode. The linear ion source also contains a labyrinth system that distributes the precursor gas evenly along its length and which allows it to supersonically expand between the anode-cathode space internally. The electrical energy then cracks the gas to produce a plasma within the source. The ions are expelled out and directed toward the substrate 1 on which the layer(s) 3 is to be grown. The ion beam emanating from the slit is approximately uniform in the longitudinal direction and has a gaussian profile in the transverse direction. Exemplary ions 34 are shown in FIG. 7. A linear source as long as 0.5 to 3 meters may be made and used, although sources of different lengths are anticipated in different embodiments of this invention. Electron layer 35 is shown in FIG. 7 and completes the circuit thereby enabling the ion beam source to function properly.

Exemplary methods of depositing a DLC inclusive hydrophilic layer 3 over top of and on a substrate 1 (the substrate may have other layer(s) (e.g., layer 2) already provided thereon) will now be described. These methods are for purposes of example only and are not intended to be limiting. The energies used during the deposition process of layer 3 and/or the directionality provided by the ion beam deposition techniques enable layer 3 to be fairly uniformly deposited over all aspects of the underlying structure.

Prior to layer 3 being formed on substrate 1, the top surface of substrate 1 may be cleaned by way of a first linear or direct ion beam source. For example, a glow discharge in argon (Ar) gas or mixtures of $Ar/O_2$ (alternatively $CF_4$ plasma) may be used by the source to remove any impurities on the substrate surface. Preferably, no oxygen or fluorocarbons are used since in the next step doping with N and/or B atoms takes place. Such interactions are physio-chemical in nature. The power density may be, for example, 1 Watt/$cm^2$. Substrate 1 may also be cleaned by, for example, sputter cleaning the substrate prior to actual deposition of layer 3. While cleaning may be performed in some embodiments, it need not be performed in other embodiments of this invention.

Then, the deposition process for DLC inclusive layer 3 on substrate 1 may be performed using the linear ion beam source and corresponding deposition technique as illustrated in FIGS. 7–8 (e.g., see linear ion beam 25). The ion beam source 25 (which may be the same or a different source than the cleaning ion beam source) functions to deposit a ta-C inclusive layer 3 (hydrogenated in certain embodiments) on substrate 1, along with dopants (e.g., N and/or B) therein. Exemplary feedstock gases which may be used include Nitrogen gas, diborane gas, and/or $C_2H_2$ gas.

Alternatively, layer 3 may be deposited using a filtered cathodic vacuum arc ion beam apparatus (FCVA-IB) as disclosed in *"Tetrahedral Amorphous Carbon Deposition,* *Characterisation and Electronic Properties"*, by Veerasamy, Cambridge 1994 (incorporated herein by reference). This deposition process may be achieved just after a plasma clean of the substrate 1 using the same deposition chamber, or another chamber. In such techniques, a cathodic arc discharge of an ultrapure carbon target may be triggered in a base vacuum of, e.g., $<10^{-6}$ Torr. A target consisting essentially of Hoescht carbon may be machined into a cylindrical electrode about 90 mm in diameter and about 50 mm deep. Conditions of arc discharge may be, e.g., 70 A and 17 V. The pressure during the cathodic arc process may be in the range of a tenth of a mTorr. One, two, or more dopant gas(es) may be simultaneously introduced into the toroidal bend region. Exemplary gases may be diborane (including a dopant B) and Nitrogen. Gas flows may be controlled by two mass flow controllers in series with a needle valve. The diborane gas may be independently flowed through such a controller. The power is coupled by plasma collisions to the dopant gas diborane and Nitrogen mixture which may be introduced via a mass flow controller at the bend of the magnetic filter. An exemplary torroidal magnetic field may be 100 mTesla. The energetic carbon ions and high energy electrons together with the UV radiation produced by the arc dissociate(s) the gas mixture into extremely reactive energetic ions. In general, only ionized species (e.g., C, N, and B) are constrained to follow the toroidal magnetic field in the filter while the neutrals and macroparticles are filtered out. The flux of ionized atoms is/are transported to the growth surface on the substrate 1 so that layer 3 is formed. The ion energy can be independently varied by a grid which has a negative potential or RF bias on the substrate to tune the physical properties of the layer 3. The range of self bias potential is from, for example, −1,000 to +1,000 V. In certain embodiments, a window of 120–200 V per ion species may be used. Partial pressures used during the deposition may be, for example, from $10^{-6}$ to $10^{-4}$ Torr. Exemplary parameters which may be used in such a deposition process are: base pressure of $10^{-6}$, $N_2$ gas 0–5 sccm, $B_2H_4$ gas 0–2 sccm, a room temperature for substrate 1, and an arc power of 1,000 W. In such a manner, layer 3 including amorphous DLC doped with B and/or N may be formed on substrate 1.

The hydrophilic nature of layer 3 may be enhanced in certain embodiments by using a plasma treatment or grafting procedure which adds certain polar functional groups at the surface of layer 3, altering the chemical reactivity at the surface while the bulk properties of the layer remain substantially unaffected. In such embodiments, a plasma of Nitrogen gas ($N_2$) may be used at a pressure of about 1 mT to enhance the hydrophilic nature.

In one instance, ta-C films having thicknesses from 10 to 50 nm were deposited on quartz substrates with an interdigitated planar array of 20 $\mu$m Ni electrodes. These electrodes were prepared by conventional lithographic techniques. The influence of the adsorbed molecules on the electrical properties of the ta-C doped films were then studied using I-C-V characteristics. Strong sensitivity of the I-C-V characteristics were found in the presence of water and alcohol. The high sensitivity of the capacitance on water vapor concentration as well as the quick response to water molecules suggested a high polar component of the surface bonds. A layer 3 of ta-C:N:B also has a high density as evidenced by its high plasmon peak at about 32.9 eV.

When it is desired to hydrogenate layer 3, for example, a dopant gas may be produced by bubbling a carrier gas (e.g. $C_2H_2$) through the precursor monomer (e.g. TMS or 3 MS) held at about 70 degrees C. (well below the flashing point). Acetylene feedstock gas ($C_2H_2$) is used in certain embodiments to prevent or minimize/reduce polymerization and to obtain an appropriate energy to allow the carbon and/or hydrogen ions to penetrate the article and subimplant therein, thereby causing the layer 3 to grow. Other suitable gases, including polar inducing dopant gases, may also be used in the source to create the ions 34.

As mentioned above, in addition to doping, it has been found that the layer 3 may be made more hydrophilic in nature as a function of how it is deposited on substrate 1. The temperature of substrate 1 may be raised during the deposition process (e.g., to about 100–300 degrees C.). An alternative way in which to make the layer more hydrophilic is to increase the ion energy used during the deposition process, e.g., to about 200 to 500 eV, most preferably about 400 eV, in order to reduce $sp^3$ bonding content in the layer 3.

While ion beam deposition techniques are preferred in certain embodiments, other methods of deposition may also be used in different embodiments. For example, filtered cathodic vacuum arc ion beam techniques may be used to deposit layer 3 as discussed above. Moreover, sputtering techniques may also be used to deposit layer 3 on substrate 1 in other embodiments.

Advantages of certain embodiments of this invention include, for example, any advantage listed above, the hydrophilic nature of the article/layer, the ability of the layer 3 to withstand high temperatures without burning, the reduction of resistance so as to reduce the likelihood of static buildup, the fact that the deposition process may be performed at low temperature(s) such as room temperature in certain embodiments, the high deposition rates which may be used (e.g., >2 nm/s), the fact that the deposition process is scalable to large area deposition (e.g., >1 square meter), the high throwing power of the deposition apparatus in its capability of coating to within 5–8% on curved surfaces of a substrate 1, the smooth nature of layer 3 absent many if any pinholes, the ability to realize conformal growth of layer 3, the ability to use layer 3 in combination with other underlying layers such as low-E layers or silicon nitride layers or silicon oxide layers, and the ability to tune the layer's properties by varying the ion energy and/or gases used during the deposition process.

Once given the above disclosure, many other features, modifications, and improvements will become apparent to the skilled artisan. Such other features, modifications, and improvements are, therefore, considered to be a part of this invention, the scope of which is to be determined by the following claims.

I claim:

1. A coated article comprising:

a glass substrate;

a hydrogenated diamond-like carbon (DLC) inclusive layer supported by the glass substrate, the DLC inclusive layer having a contact angle θ less than about 10 degrees; and wherein the hydrogenated DLC inclusive layer comprises from about 4% to 39% hydrogen and has an average density of at least about 2.4 $gms/cm^3$.

2. The coated article of claim 1, wherein the DLC inclusive layer is doped with boron (B).

3. The coated article of claim 1, wherein the substrate comprises soda-lime-silica glass.

4. The coated article of claim 1, wherein the DLC inclusive layer has the contact angle θ of less than about 10 degrees initially prior to environmental exposure.

5. The coated article of claim 1, wherein the DLC inclusive layer has contact angle θ which decreases upon environmental exposure.

6. The coated article of claim 1, wherein the DLC inclusive layer has an average hardness of at least about 10 GPa.

7. The coated article of claim 1, wherein the DLC inclusive layer has an average hardness of at least about 20 GPa.

8. The coated article of claim 1, wherein at least about 60% of carbon—carbon bonds in the hydrogenated DLC inclusive layer are of the $sp^3$ type.

* * * * *